United States Patent [19]
Ito

[11] 3,908,054
[45] Sept. 23, 1975

[54] RESILIENT SUPPORTING UNIT FOR STRUCTURE SUCH AS BRIDGES

[75] Inventor: Norihito Ito, Tokyo, Japan

[73] Assignees: Nihon Kikaikougyou Kabushiki Kaisha; Kabushiki Kaisha Miwasyokai, both of Tokyo, Japan

[22] Filed: Apr. 8, 1974

[21] Appl. No.: 458,781

[52] U.S. Cl. ............ 428/64; 14/16; 308/2; 308/238; 428/138; 428/67
[51] Int. Cl.² .. B32B 1/04; B32B 3/10; E01D 19/06; F16C 27/06
[58] Field of Search ............. 161/42, 112, 113, 5; 14/16; 308/238, 2, 2 R

[56] References Cited
UNITED STATES PATENTS

| | | | |
|---|---|---|---|
| 3,397,856 | 8/1968 | Sullivan et al. | 14/16 X |
| 3,504,904 | 4/1970 | Irwin et al. | 308/2 R X |
| 3,514,165 | 5/1970 | Marsh | 14/16 X |
| 3,544,415 | 12/1970 | Price et al. | 14/16 X |
| 3,799,637 | 3/1974 | McCullough et al. | 308/238 |
| 3,806,975 | 4/1974 | Fyfe | 14/16 |

*Primary Examiner*—Philip Dier
*Attorney, Agent, or Firm*—George B. Oujevolk

[57] ABSTRACT

A metallic ring-like member is affixed and buried in an intermediate portion of a resilient structural support made of an elastic material such as rubber, so that bulging of the intermediate portion in the peripheral surface of the resilient supporter is prevented by the ring-like member. Elastic layers disposed above and below the ring-like member are inter-connected across a large hole in the ring-like member. Also an elastic supporter is made in the form of a strong block which has a plurality of elastic layers. Moreover, the elastic supporting unit can be formed in a circular shape, and thus directivity of the elastic supporting means is eliminated when used for erection.

3 Claims, 10 Drawing Figures

RESILIENT SUPPORTING UNIT FOR STRUCTURE SUCH AS BRIDGES

BACKGROUND OF THE INVENTION

The present invention relates to an improvement of a resilient supporting unit having elastic layers which resiliently shifts bridges or other structures in the horizontal direction.

BRIEF REVIEW OF THE PRIOR ART

Structures such as bridges tend to expand and contract because of changes in temperatures, and also when earthquakes occur, large horizontal forces act on the strucutre, and thus the structure is required to be supported so that it can shift in the horizontal direction.

As a means for shiftably supporting structures such as bridges in the horizontal direction, an arrangement is used which is produced by uniting an upper and lower hard material layers which are made of steel plate or hard rubber plate on an upper and a lower surface of an elastic layer of square type made of soft rubber (hardness 50 – 70 degrees) through a baking process heretofore known.

Where the structure such as a bridge girder is supported by a resilient supporting unit of this type, in case the structure contracts and expands due to temperature changes or horizontal earthquake forces acting on the structure, the elastic layer is subjected to shearing deformation which permits transversal shifting by expansion and contraction and also by horizontal earthquake forces.

As the amount of contraction and expansion of the structure becomes greater as compared with the length, the thickness of the elastic layer is required to be proportionally greater than the length of the structure. Also, when the vertical load on the structure acts on the elastic supporting unit, the horizontal force expanding radially in the horizontal direction from the center portion of the elastic supporting means becomes greater with regard to the elastic layer in proportion to the vertical load, and in case the peripheral surface of the elastic layer bulges in proportion to the vertical load, the compression strain of the elastic supporting unit becomes greater, and moreover the swelling of the peripheral surface and compression strain are on the increase according to the increment of thickness of the elastic layer.

However, when the swelling becomes excessively great, the durability of the elastic layer which is made of an elastic material such as rubber deteriorates and therefore it is necessary to make the swelling of the peripheral surface of the elastic layer below a fixed value.

Heretofore, as the elastic supporting unit that supports a relatively long structure subjected to great contraction and expansion in the horizontal direction so as to be shiftable, a type of device in which there were a number of laminated elastic supporting units, was used. Each of said units consisted of an elastic layer, an upper hard material layer and a lower hard material layer which were firmly and integrally fixed to the upper surface and lower surface, but in case of the stacked type elastic supporting means, when each elastic supporting unit was stacked on the bridge girder on the foundation, careful attention was required to assure that each supporting unit was accurately stacked so that the units were not displaced relatively to the horizontal direction, and also when the structure was lowered on the stacked type elastic supporting means, there was apprehension that the elastic supporting unit of the upper part would tend to slip in the horizontal direction with respect to the elastic supproting unit of the lower part.

Also, an elastic supporting unit has been known in which an intermediate hard rubber layer for preventing elongation in the horizontal direction is integrally interposed in the intermediate portion of the elastic layer, but the intermediate hard rubber layer is relatively easily elongated, and therefore, the elongation preventing force, namely swelling preventing force is relatively small, and for this reason the compression strain of the elastic supporting means becomes considerably greater, and also there is a drawback that the intermediate hard rubber layer has little tensile strength, and therefore a considerable wall thickness of the layer is required, and therefore the thickness of the elastic supporting means becomes greater.

OBJECTS OF THE INVENTION

An object of the present invention is to prevent the swelling of the intermediate portion on the peripheral surface of an elastic supporter by burying a metallic ring-like member in the intermediate portion in the thickness direction in a disc-like elastic supporter which is made of an elastic material such as rubber.

Another object of the present invention is to provide a strong block made of an elastic supporting unit having a plurality of elastic layers by integrally connecting the elastic layers disposed above the metallic ring-like member and the elastic layers disposed below the metallic ring-like member across large holes in the ring-like members.

Still another object of the present invention is to make the erecting operation easier by eliminating directivity when the elastic supporting means is erected by making the elastic supporting unit in circular form.

SUMMARY OF THE INVENTION

Generally speaking, the present invention contemplates a structural support unit wherein a metallic ring-like member is affixed and buried in an intermediate portion of a resilient structural support made of an elastic material such as rubber, so that bulging of the intermediate portion in the peripheral surface of the resilient supporter is prevented by the ring-like member. Elastic layers disposed above and below the ring-like member are inter-connected across a large hole in the ring-like member. Also an elastic supporter is madee in the form of a strong block which has a plurality of elastic layers. Moreover, the elastic supporting unit can be formed in a circular shape, and thus directivity of the elastic supporting means is eliminated when used for erection.

DETAILED DESCRIPTION OF THE INVENTION

Figure 1:
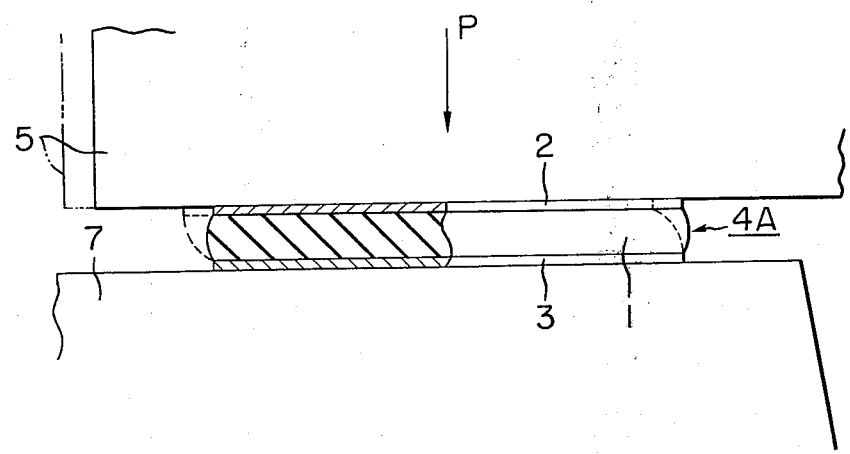
FIG. 1 is a partial vertical cross sectional side view showing a conventional elastic supporting unit of the prior art in use.
Figure 2:
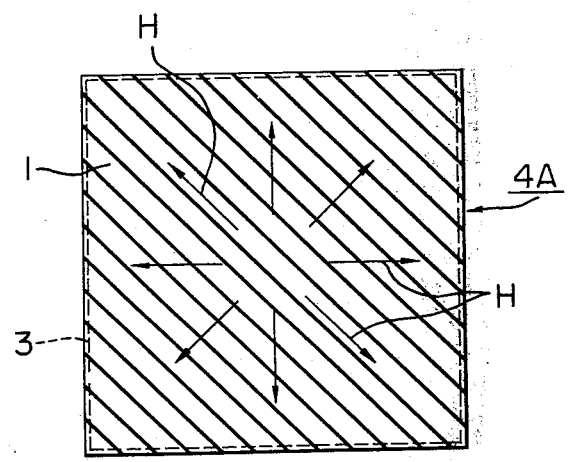
FIG. 2 is a view showing the horizontal force acting on the elastic layer of FIG. 1.
Figure 3:
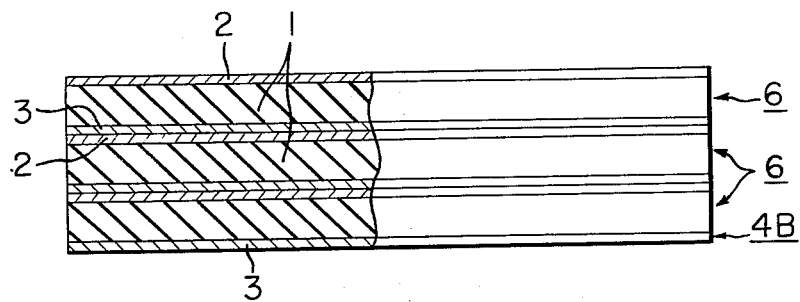
FIG. 3 and FIG. 4 each are partial vertical side views showing another conventional elastic supporting unit.
Figure 4:
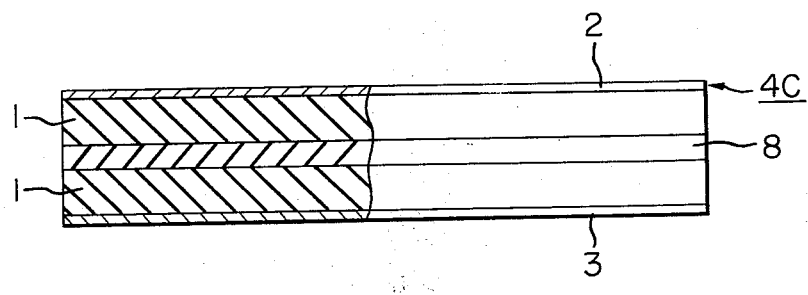

Shown in FIGS. 1 to 4 are prior art arrangements of resilient supporting unit using an elastic layer 1 of the square type (previously described) with an upper hard material layer 2 and a lower hard material layer 3. The structure 5 is supported by the aforementioned resilient supporting means 4A. The supporting means 4A are subjected to a horizontal force H and a vertical load P. To support a long structure, laminated supporting units 6 were used in connection with stacked type elastic supporting unit 4B stacked on a foundation 7. Another device of the piror art is shown in FIG. 4 comprising elastic supporting means 4C, with an intermediate hard rubber layer 8.

Figure 5:
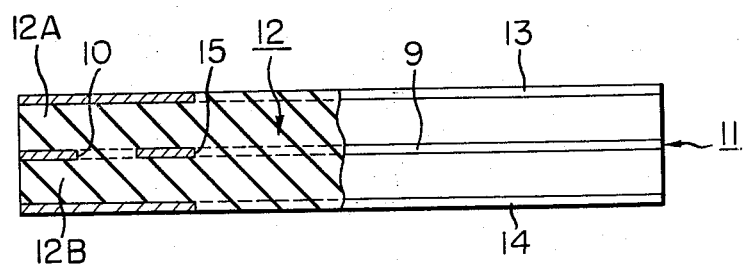
FIG. 5 is a partial vertical side view showing an elastic supporting unit of one embodiment of the present invention.
Figure 6:
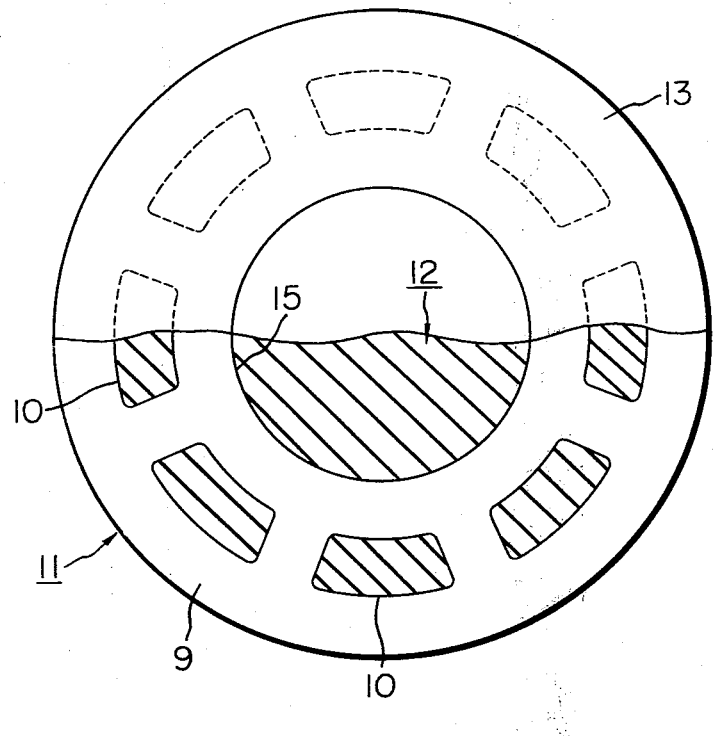
FIG. 6 is a plan view with a portion cut away.

FIG. 5 and FIG. 6 show one embodiment of the present invention, in which a plurality of holes 10 are formed on the periphery of a ring-like metal plate 9 made of steel or aluminum to form a metallic ring-like member 11, and the ring-like member 11 is buried in an intermediate portion of the thickness of the disc-like elastic supporting body 12 made of soft rubber having hardness 50° – 70°, and at the upper surface and lower surface of the disc-like elastic supporting body 12, an upper ring-like member 13 and a lower ring-like member 14 are buried which are made of a ring-like steel plate or a ring-like aluminum plate, and the elastic supporting body 12 and each ring-like member 11, 13, 14 are integrally united by baking.

The upper surface of the upper ring-like member 13 and the upper surface of the center portion of the elastic supporting body 12 are disposed in an identical plane, and the lower surface of the lower ring-like member 14 and the lower surface of the center portion of the elastic supporting body 12 are disposed in an identical plane, and moreover the elastic layer 12A disposed above the ring-like member 11 and the elastic layer 12B disposed below the ring-like member 11 are integrally connected across multiple aperture or holes 10 formed on the periphery of the ring-like member 11 and the hole 15 formed in the center portion of the ring-like member 11.

When the vertical load of the structure acts on the elastic supporting means having the foregoing sturcture, the elongating force of the horizontal direction acting on the intermediate portion of the thickness direction of the elastic supporting body 12 is uniformly transmitted on the entire periphery of the metallic ring-like member 11, and thus the hoop tension acts on the ring-like member 11, and for this reason, it becomes possible to prevent swelling deformation due to the elongation of the intermediate portion in the thickness direction of the elastic supporting body 12 by utilizing the ring-like member 11 made of metallic materials such as steel or aluminum which are materials not easily elongated and having high tensile strength.

Figure 7:
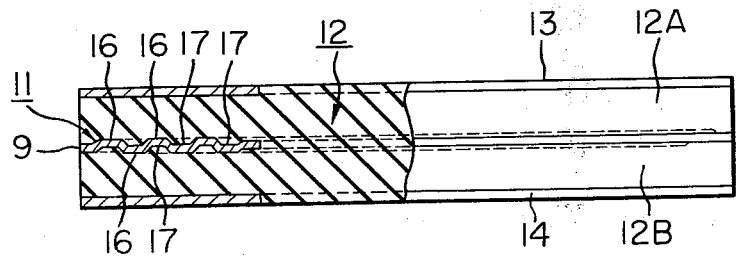
FIG. 7 is a partial vertical side view showing an elasting supporting unit of another embodiment of the present invention.
Figure 8:
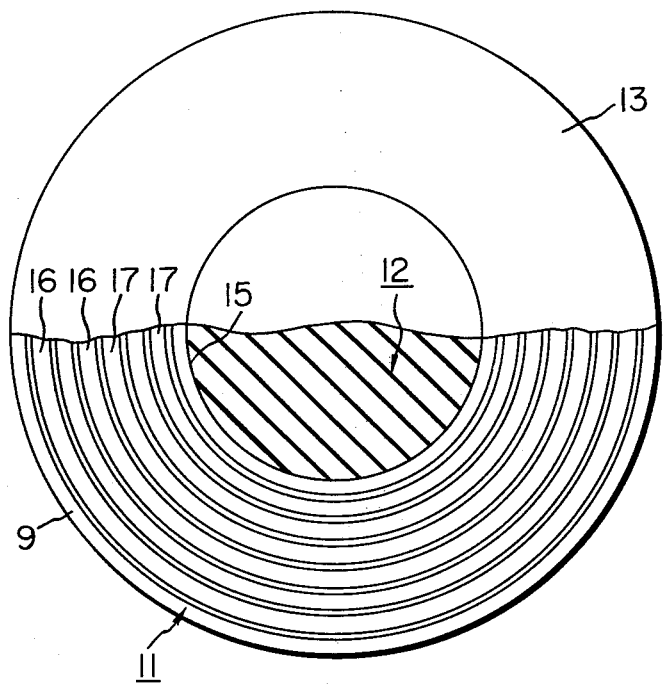
FIG. 8 is a plan view with a portion cut away.

FIG. 7 and FIG. 8 show a second embodiment of the present invention and a plurality of ring-like projections 16 which are disposed concentrically and a plurality of ring-like grooves 17 are formed on the upper surface and lower surface of the ring-like metal plate 9 made of steel or aluminum by a stamping processes to constitute a metallic ring-like member 11, and the ring-like member 11 is embedded in the intermediate portion in the thickness direction of the disc-like elastic body 12 made of soft rubber so as to be formed integrally, but the other constructional features are identical with those of the first embodiment.

In the second embodiment, as a plurality of ring-like projections 16 and a plurality of ring-like grooves 17 are formed on the upper surface and lower surface of the ring-like metal plate 9, while preventing the deterioration of strength due to the reduction of the cross-section of the ring-like member 11, the adhesion areas of the each elastic layers 12A, 12B and the ring-like member 11 is increased, so that they can be firmly coupled, and also the elastic layers 12A and 12B and the ring-like member 11 are engaged with a plurality of ring-like projections 16 and a plurality of ring-like grooves 17, and thus the horizontal directional coupling strength of the each elastic layer 12A, 12B and the ring-like member 11 is greatly increased.

Figure 9:
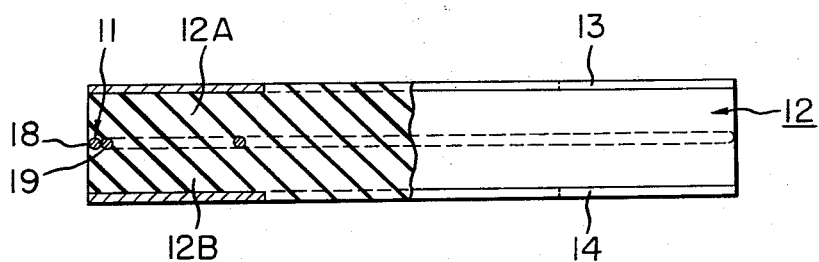
FIG. 9 is a partial vertical cross-sectional side view showing an elastic supporting unit of a third embodiment of the present invention; and, FIG. 10 is a plan with a portion cut away.
Figure 10:
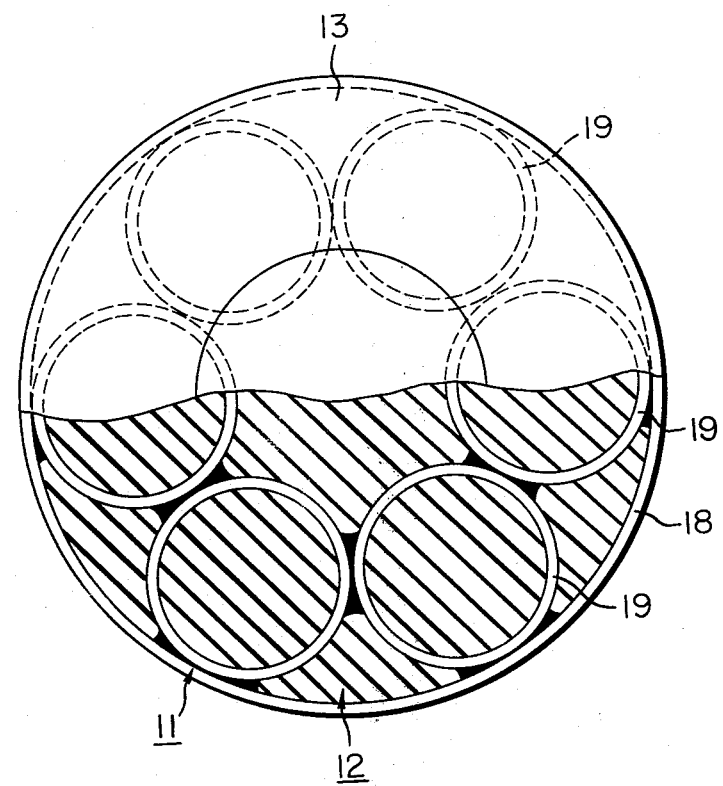

FIG. 9 and FIG. 10 show a third embodiment of the present invention, in which a steel bar (for example, an iron reinforcing bar having a diameter of 9–13 mm) is curved into a circular shape, and both end portions are joined by welding, i.e., a large diameter outside ring 18 is formed. On the inside of the large diameter outside ring 18, other steel bars are curved in circular shape, and end portions are joined by welding to form small diameter inside rings 19 and a plurality of such small inside rings 19 are joined to the large diameter outside ring 18 by welding. Adjacent small diameter inside rings 19 are further joined by welding to form a globe-like member.

The ring-like member 11 having the foregoing construction is disposed concentrically in the center portion of the thickness direction of the disc-like resilient supporting body 12 made of soft rubber, and it is integrally embedded therein, and the elastic layer 12A disposed above the ring-like member 11 and the elastic layer 12B disposed below the ring-like member 11 are joined integrally at portions of holes formed by the respective rings 18 and 19.

In the case of the third embodiment, the total areas of the holes of the ring-like member 11 becomes very great, and the elastic layer 12A disposed above the ring-like member 11 and the elastic layer 12B disposed below the ring-like member 11 are continuous and joined with a considerably larger area, and therefore an elastic supporting device having integrating properties cay be obtained.

In case the thickness of the elastic supporting body 12 is great, it is possible to embed a plurality of ring-like members 11 with an interval between them in the vertical direction in the intermediate portion of the direction of thickness of the elastic supporting body 12, and also it is possible to make one upper surface and lower surface of the elastic supporting body 12 in a flat form over the entire body and the hard rubber or circular metal plate having no holes thereon may be formed by means of a baking process or a bonding agent.

In case of making the ring-like member 11 with steel material, the peripheral surface of the ring-like member is coated with an elastic supporting body 12, and thus rust on the ring-like member may be prevented.

I claim:

1. A resilient supporting unit for a structure comprising upper and lower flat resilient members and a metal plate of ring configuration integrally embedded between said resilient members in the longitudinal direction, said plate having upper and lower surfaces with projections and grooves in a ring configuration.

2. A resilient supporting unit for structures comprising a disc-like elastic supporting body, said body having thickness and an intermediate portion, a plurality of small diameter metal rings within the inside of a large diameter outside metal ring, said rings all being disposed concentrically and joined together to form a ring member, said ring member being embedded in said intermediate portion.

3. A unit as claimed in claim 2 in which the large outside ring and the plurality of small inside rings are steel bars bent in circular shape with ends joined.

* * * * *